US008370491B1

(12) United States Patent
Breau et al.

(10) Patent No.: US 8,370,491 B1
(45) Date of Patent: Feb. 5, 2013

(54) OPEN MOBILE ALLIANCE PROVISIONING VIA A GLOBAL WIMAX DEVICE REGISTRY

(75) Inventors: Jeremy R. Breau, Kansas City, MO (US); John E. Belser, Olathe, KS (US); Arun Santharam, Olathe, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1629 days.

(21) Appl. No.: 11/765,779

(22) Filed: Jun. 20, 2007

(51) Int. Cl.
*G06F 15/173* (2006.01)
*H04M 1/66* (2006.01)
(52) U.S. Cl. ........................ 709/226; 455/411
(58) Field of Classification Search .......... 709/227–228; 455/410–414.1
See application file for complete search history.

(56) References Cited

U.S. PATENT DOCUMENTS

| 6,304,746 | B1 | 10/2001 | Fascenda et al. |
| 6,856,604 | B2 | 2/2005 | Lundby |
| 7,308,261 | B2 | 12/2007 | Henderson et al. |
| 7,412,405 | B2 | 8/2008 | Huang et al. |
| 7,752,305 | B2 * | 7/2010 | Gava et al. ............ 709/224 |
| 7,937,751 | B2 * | 5/2011 | Tom ........................ 726/9 |
| 8,032,115 | B1 * | 10/2011 | Breau et al. ............ 455/411 |
| 2005/0039178 | A1 * | 2/2005 | Marolia et al. ............ 717/168 |
| 2005/0055397 | A1 * | 3/2005 | Zhu et al. ............ 709/200 |
| 2005/0254652 | A1 | 11/2005 | Engler |
| 2006/0173976 | A1 * | 8/2006 | Vincent et al. ............ 709/220 |
| 2006/0218480 | A1 | 9/2006 | Moggert et al. |
| 2007/0112504 | A1 | 5/2007 | Krause et al. |
| 2007/0156697 | A1 | 7/2007 | Tsarkova |
| 2007/0219908 | A1 | 9/2007 | Martinez |
| 2007/0232358 | A1 | 10/2007 | Sherman |
| 2008/0064367 | A1 | 3/2008 | Nath et al. |
| 2008/0096504 | A1 | 4/2008 | Linkola et al. |

OTHER PUBLICATIONS

Office Action mailed Jul. 23, 2009, in U.S. Appl. No. 11/671,247.
Final Office Action mailed Jan. 5, 2010, in U.S. Appl. No. 11/671,247.
Office Action mailed Sep. 2, 2010, in U.S. Appl. No. 11/671,247.
Office Action mailed Feb. 1, 2011, in U.S. Appl. No. 11/671,247.

\* cited by examiner

*Primary Examiner* — Chirag R Patel
(74) *Attorney, Agent, or Firm* — Crowell & Moring LLP

(57) ABSTRACT

A method, system, and computer-readable media are provided for writing provisioning parameters to a device. In a first aspect, a set of computer-readable media provide a method that includes receiving a request for access onto a communication network from a device. Attributes about the device are retrieved from a first database that details the capabilities of the device. One of the attributes may identify the device a being capable of being provisioned via Open Mobile Alliance protocol, wherein the first database sends a request to a second database to retrieve a tree structure of the device. The tree structure is populated with one or more provisioning parameters, and the populated tree structure is written to the device.

18 Claims, 4 Drawing Sheets

OPEN MOBILE ALLIANCE PROVISIONING VIA A GLOBAL WIMAX DEVICE REGISTRY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

Exemplary embodiments of the present invention are directed to writing provisioning parameters to a device.

2. Description of Related Art

U.S. Patent Application Publication No. 2005/0039178 discloses a system and method for downloading update packages into a mobile handset in a carrier network. U.S. Patent Application Publication No. 2005/0055397 discloses a system and method for an OMA DM extension to manage mobile device configuration settings. U.S. Pat. No. 7,937,751 discloses a universal device ID registry, back-end, and self-verification architecture.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention solve at least the above problems by providing a system and method for, among other things, writing provisioning parameters to a device.

In a first aspect, a set of computer-readable media provide a method that includes receiving a request for access onto a communication network from a device. The method further includes retrieving attributes of the device from a first database, wherein at least one attribute identifies the device as capable of being provisioned via Open Mobile Alliance protocol. Moreover, the method includes retrieving a tree structure of the device from a second database, wherein the tree structure is populated with one or more provisioning parameters. Additionally, the method includes writing the populated tree structure to the device.

In a second aspect, a second set of computer-readable media provide a method that includes receiving a request for device attributes of a device, wherein the request includes a hardware identifier of the device. The method further includes providing the device attributes based on the hardware identifier. Moreover, the method includes determining that the device is capable of being provisioned via Open Mobile Alliance protocol based on the hardware identifier. Furthermore, the method includes forwarding the hardware identifier to a server in order to retrieve a tree structure of the device, wherein the tree structure is populated with one or more provisioning parameters and is written to the device.

In a third aspect, a system provides a first database for associating a hardware identifier and device attributes for each of a plurality of devices. The system further includes a second database for associating the hardware identifier and a tree structure for each of the plurality of devices. Additionally, the system includes a provisioning system for populating a tree structure with one or more provisioning parameters. Furthermore, the system includes a network operator for writing the populated tree structure to a device requesting access to the network operator's communication network.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
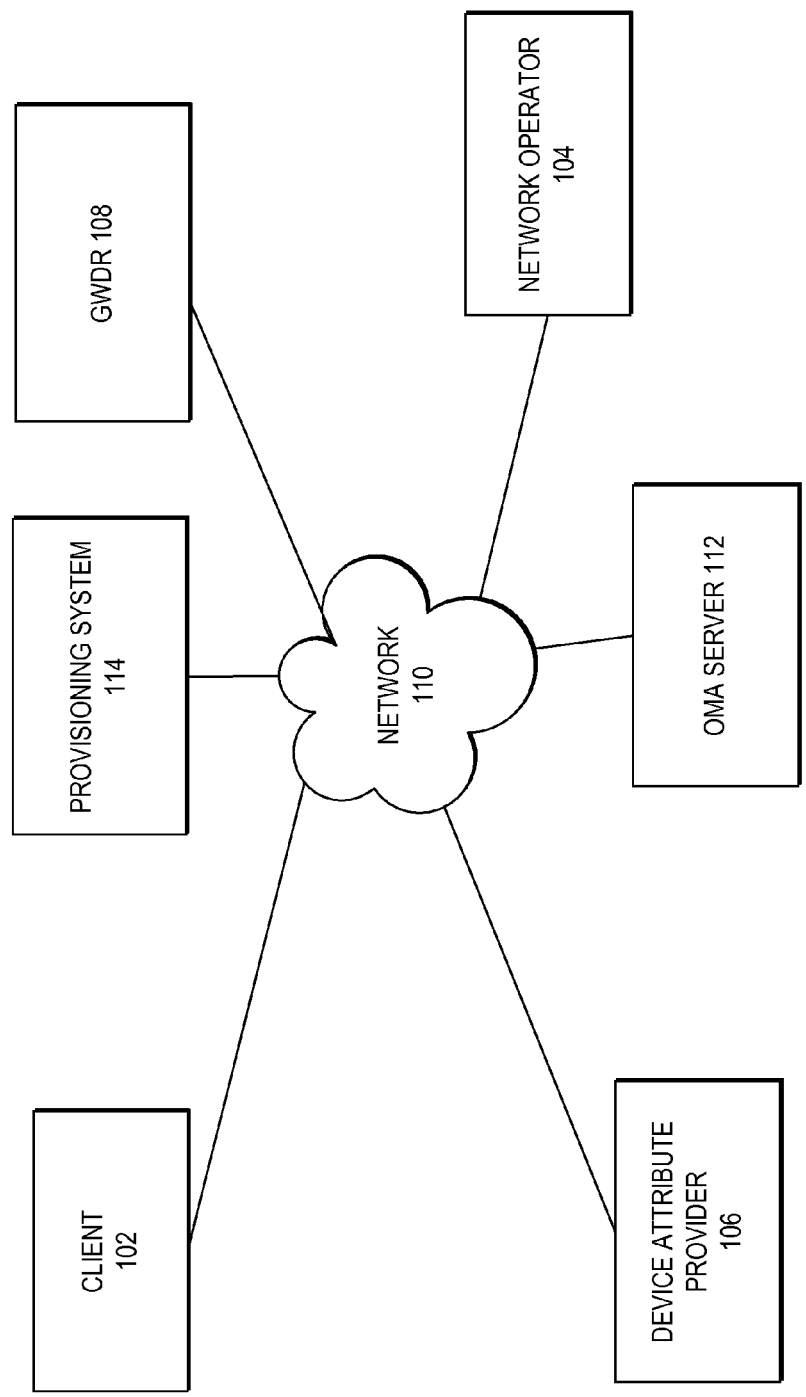
FIG. 1 is a block diagram of an embodiment of a system for implementing the invention.

FIG. 1 is a block diagram of an embodiment of a system 100 for implementing the invention. System 100 includes client 102, network operator 104, device attribute provider 106, Global Worldwide Interoperability for Microwave Access (WiMAX) Device Registry (GWDR), and network 110. Client 102 may be or can include a laptop computer, a network-enabled mobile telephone (with or without media capturing/playback capabilities), a wireless email client, a personal digital assistant (PDA), or other software client. The mobile device 102 may also include a machine or device to perform various tasks including video conferencing, web browsing, search, electronic mail (email) and other tasks, applications and functions. Mobile device 102 may additionally be a portable media device such as digital camera devices, digital video cameras (with or without still image capture functionality), media players such as personal music players and personal video players, and other portable media devices.

Client 102 may also be or can include a server such as a workstation running Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™, Apache™ OpenStep™, or other operating system or platform. Client 102 can include a communication interface. The communication interface may be an interface that can allow the client to be directly connected to any other device or allows the client 102 to be connected to a device over network 110. Network 110 can include, for example, a local area network (LAN), a wide area network (WAN), or the Internet. In an embodiment, the client 102 can be connected to another device via a wireless interface through network 110 that can be a WiMAX network for example.

Network operator 104 may be a server such as a workstation running the Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™, Apache™ OpenStep™, or other operating system or platform. Network operator 104 is used to manage access to a wireless service provider's wireless network. In an embodiment, the network operator 104 manages a service provider's WiMAX connectivity network and provides data network connectivity to the Internet or other networks. The network operator 104 can evaluate attributes of a client device 102 to determine whether the device is authorized access the service provider's network, and can determine how to properly deliver services and applications to a client device based on the device's capabilities.

Device attribute provider 106 may be an entity capable of submitting attributes of a client device to database for storage, wherein the attributes define the capabilities of the client device. Such a database may be the GWDR 108. In an embodiment, GWDR 108 is created using techniques described in U.S. patent application Ser. No. 11/671,247 entitled "Global WiMAX Device Registry," which is hereby incorporated by reference. Such entities that can submit device attributes may include manufacturers, retailers, and end users of client devices. Such attributes may include a hardware identifier, a Media Access Control identifier (MAC ID) or device model number for example, the make and model of the device, the authentication capabilities of the device, whether the device is capable of being provisioned via Open Mobile Alliance (OMA) protocol, whether the device has Voice-over Internet Protocol (VOIP) capabilities, whether the device can display video content, whether the device supports video advertisements, whether the device has a keyboard, and other information a network operator can use to provide connectivity, applications, and services to a client device. Device attribute providers 106 may submit device attributes via a website of the GWDR 108, through an email service provided by the entity managing the GWDR 108, or by calling a representative of the entity managing the GWDR 108. In an embodiment, data may be organized within the GWDR 108 by associating the hardware identifier for each device with the device's corresponding attributes. In another embodiment, data may be organized within the GWDR 108 by associating the hardware/device model number with the device's corresponding attributes. Once the GWDR 108 has been created, the network operator 104 can access the GWDR 108 to obtain attributes of a requesting device to determine if the device is authorized to access the service provider's network. The network operator can also use the attributes to determine how to properly deliver services, applications, and render content to the client device.

OMA server 112 may be a server such as a workstation running Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™, Apache™, OpenStep™, or other operating system or platform. OMA server 112 is used to activate and manage client devices 102 using over-the-air access technologies and protocols such as WiMAX. Information within the OMA server 112 is pushed to a device, and the device uses that information to access a network operator's network. The OMA server 112 is configured to store a tree structure for each of a plurality of devices and associates each device's tree structure with a corresponding hardware identifier of the device. The tree structure defines certain elements of the device that can be provisioned by a network operator. In an embodiment, the device's tree structure is obtained by the OMA server 112 from the device's manufacturer. These elements, set by a manufacturer or other entity, allow a network operator to configure different settings on a device that informs the device how the network operator desires the device to behave. The elements are represented by open slots of the tree structure. A network operator can input provisioning parameters into the open slots in order to get the device to behave as the network operator desires. A provisioning parameter is generally any type of metric that can affect the manner in which the device behaves. Some provisioning parameters include, but are not limited to, a Network Access Identifier (NAI) parameter, an Extensible Authentication Protocol (EAP) parameter, and a device lock parameter. In an embodiment, the tree structure is represented by an Extensible Markup Language (XML) file. The OMA server 112 is configured to respond to requests for device tree structures by receiving a hardware identifier from a requester, searching within its database for a tree structure that corresponds to the received hardware identifier, and providing the corresponding tree structure to the requester or other entity.

Provisioning system 114 may be a server such as a workstation running Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™, Apache™, OpenStep™, or other operating system or platform. In an embodiment, provisioning system 114 is a component within network operator 104. Provisioning system 114 is configured to receive requests from client devices, OMA servers 112, or network operators 104 to provision a client device. In an embodiment, the provisioning system 114 is configured to receive a tree structure from OMA server 112 and modify or input provisioning parameters into the open slots of the tree structure. In an embodiment, the provisioning parameters inputted into the tree structure are determined by the network operator 104, such that the network operator 104 conveys to the provisioning system 114 what provisioning parameters should be inputted into a tree structure. The provisioning parameters inputted into the device's tree structure can be specific for a particular device or can be generally applied to all devices. Once the provisioning system 114 populates the tree structure with the appropriate provisioning parameters, the provisioning system 114 can proceed to transmit the populated tree structure to the network operator which can in turn write the populated tree structure to a client device. In an embodiment, the provisioning system can write the populated tree structure directly to the client device.

Figure 2:
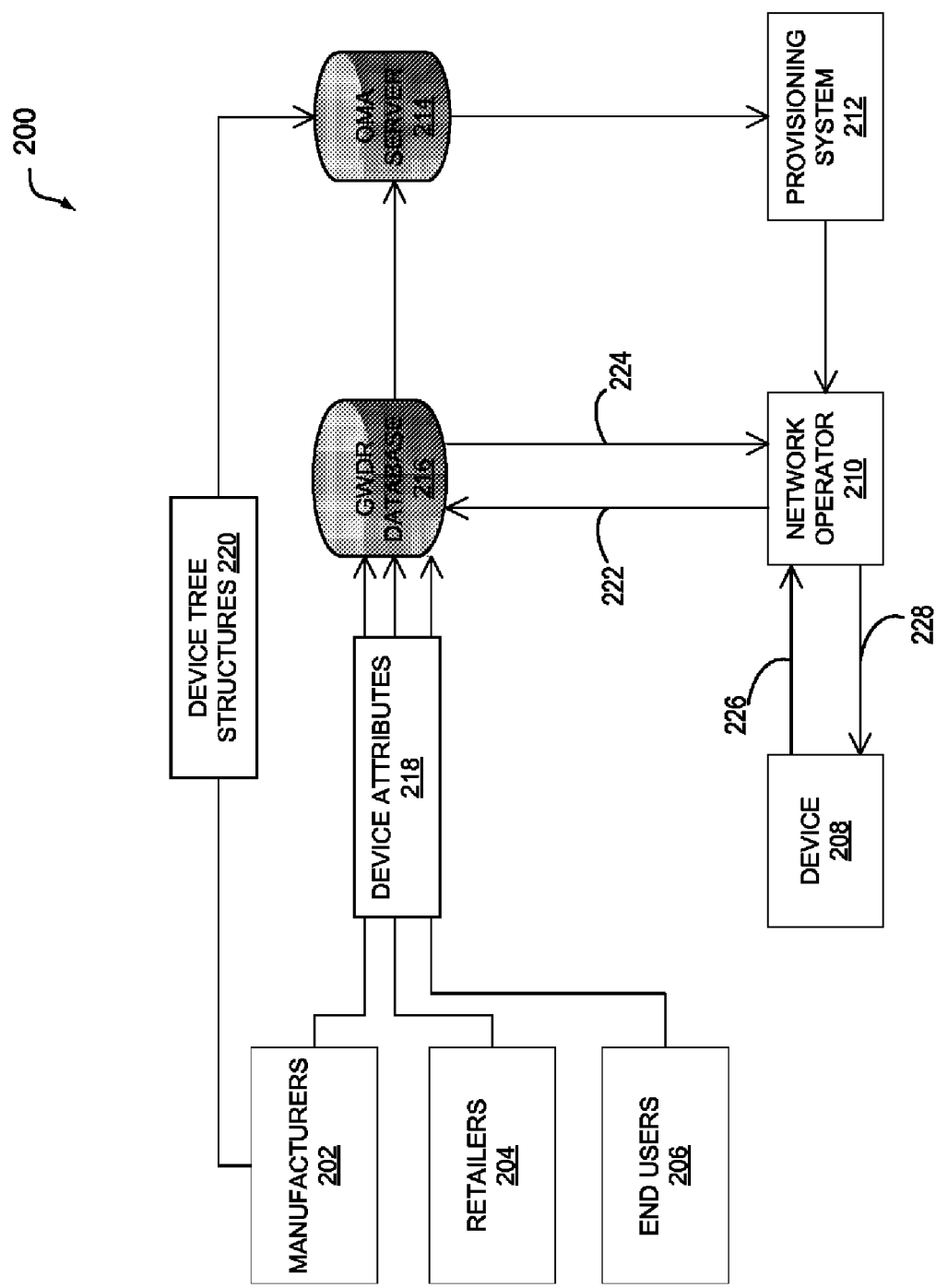
FIG. 2 is a block diagram of an exemplary method for writing provisioning parameters to a mobile device via a Global WiMAX Device Registry (GWDR) database according to an embodiment of the invention.

FIG. 2 is a block diagram of an exemplary method 200 for writing provisioning parameters to a mobile device via a GWDR database according to an embodiment of the invention. Device 208 initially makes a request 226 to access a wireless network supported by the network operator 210. In the example, device 208 is a device in which the network operator 210 has not certified before being sold to an end user, or is a device that the network operator 210 does not have knowledge of its capabilities. Without this knowledge, the network operator 210 may not be able to properly format services and applications according to the device's specific capabilities. In order to obtain the capabilities of the device, network operator 210 makes a request 222 to the GWDR database 216 for the device attributes that represent the capabilities of the device 208. The request 222 may include a hardware identifier of the device 208 that may be initially received by the network operator 210 in the request 226.

The GWDR database 216 is initially populated with device attributes for a plurality of devices by manufacturers 202, retailers 204, and end users 206 submitting the device attributes 218 into the GWDR database 216. The GWDR database 216 can search for the device attributes corresponding to the hardware identifier and can send the device attributes to the network operator in a reply 224. In an embodiment, once the network operator 210 receives the device attributes, the network operator can associate and store the hardware identifier with the corresponding device attributes so that the network operator will not have to contact the GWDR database 216 again if the device 208 subsequently attempts to request access from the network operator 210 in the future.

If the GWDR database 216 identifies one of the device attributes as indicating the device 208 is capable of being provisioned via OMA protocol, the GWDR database 216 forwards the hardware identifier to the OMA server 214 to begin a process of provisioning parameters being written to the device 208. Once the OMA server 214 receives the hardware identifier from the GWDR database 216, the OMA server can locate the tree structure that corresponds to the received hardware identifier. The OMA server is initially populated with tree structures for a plurality of devices by manufacturers of such devices submitting the tree structures 220 to OMA server 214. The OMA server 214 proceeds to associate the received tree structures with the corresponding hardware identifiers. Once the OMA server 214 identifies the corresponding tree structure for the hardware identifier received from the GWDR database 216, the OMA server 214 will then transmit the tree structure to the provisioning system 212.

The provisioning system 212 can then input one or more provisioning parameters into the empty slots of the tree structure. In an embodiment, the types of provisioning parameters configured into the tree structure is determined by the network operator 210. Once the provisioning parameters have been populated into the tree structure, the provisioning system 212 can proceed to transmit the populated tree structure to the network operator 210 which can in turn write the populated tree structure, represented by line 228, to the device 208. In an embodiment, the provisioning system 212 can bypass the network operator 210 and write the populated tree structure directly to the device 208. In an embodiment, the network operator 210 can also write the device attributes received from the GWDR database 216 to the device. Once the device attributes and/or the provisioning parameters have been written to the device 208, in an embodiment, it will be unnecessary for the network operator 210 to retrieve this information from the GWDR database 216 and/or OMA server 214 when the device requests network access in the future as the device can provide this information in its request.

Figure 3:
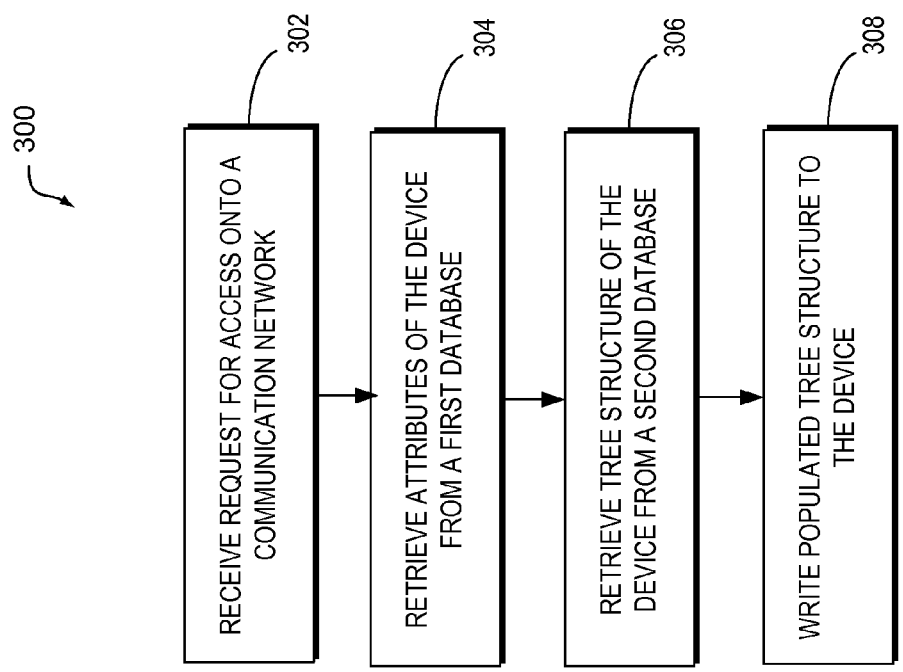
FIG. 3 is a flow diagram of an exemplary method for writing provisioning parameters to a device via a GWDR database.

FIG. 3 is a flow diagram of an exemplary method 300 for writing provisioning parameters to a device via a GWDR database. At operation 302, request for access onto a communication network is received from a device. In an embodiment, the request is received by a network operator such as network operator 210. At operation 304, one or more attributes of the device are retrieved from a first database. The first database may be, for example, GWDR database 216. The retrieved attributes may be based on a hardware identifier that is received in the request. Moreover, at least one retrieved attribute may identify the device as capable of being provisioned via OMA protocol. At operation 306, a tree structure of the device is retrieved from a second database. The tree structure may be retrieved, for example, from OMA server 214 and may be based on the hardware identifier. Additionally, the tree structure is populated with one or more provisioning parameters by a provisioning system as determined by the network operator 210. At operation 308, the populated tree structure is written to the device.

Figure 4:
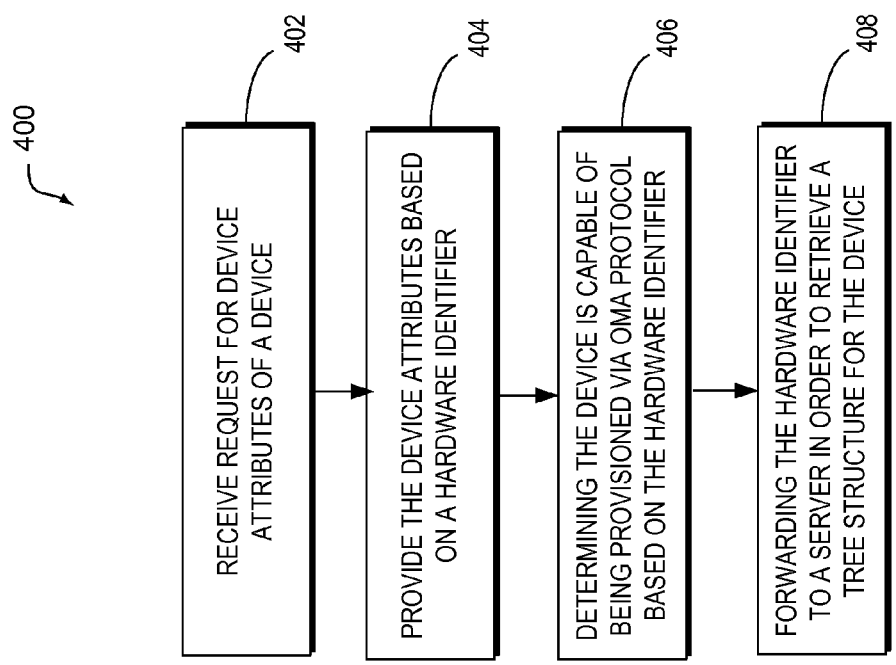
FIG. 4 is a flow diagram of another exemplary method for writing provisioning parameters to a device via a GWDR database.

FIG. 4 is a flow diagram of another exemplary method 400 for writing provisioning parameters to a device via a GWDR database. At operation 402, a request for device attributes of a device is received. In an embodiment, the request includes a hardware identifier of the device and is received by GWDR database 216. At operation 404, the device attributes are provided based on the hardware identifier. At operation 406, a determination is made that the device is capable of being provisioned via OMA protocol. In an embodiment, the determination is made based on the hardware identifier. At operation 408, the hardware identifier is forwarded to a server in order to retrieve a tree structure of the device. In an embodiment, such a server is an OMA server such as OMA server 214. The tree structure is then populated with one or more provisioning parameters and is written to the device.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of writing provisioning parameters to a device, the method comprising:

receiving a request for access onto a communication network from a device;

retrieving one or more attributes of the device from a first database, wherein at least one attribute identifies the device as capable of being provisioned via Open Mobile Alliance protocol, wherein the first database is a Global WiMAX Device Registry;

retrieving a tree structure of the device from an Open Mobile Alliance (OMA) provisioning server that stores the tree structure of the device, wherein the tree structure is populated with one or more provisioning parameters; and writing the populated tree structure to the device.

2. The non-transitory media according to claim 1, wherein the tree structure is created by a manufacturer of the device.

3. The non-transitory media according to claim 1, wherein the one or more provisioning parameters inform the device how a network operator wants the device to behave.

4. The non-transitory media according to claim 1, wherein a network operator is unaware of the device's capabilities.

5. The non-transitory media according to claim 1, wherein the one or more attributes in the first database are provided by one or more device attribute providers.

6. The non-transitory media according to claim 5, wherein the one or more device attribute providers include at least one of a manufacturer, a retailer, and an end-user.

7. One or more non-transitory computer-readable media having computer-useable instructions embodied thereon for performing a method of writing provisioning parameters to a device, the method comprising:

receiving, by a first database, a request for one or more device attributes of the device, the request including a hardware identifier of the device, wherein the first database is a Global WiMAX Device Registry;

providing, by the first database to a network operator server, the one or more device attributes based on the hardware identifier;

determining, by the first database, that the device is capable of being provisioned via Open Mobile Alliance protocol based on the hardware identifier; and forwarding, by the first database, the hardware identifier to an Open Mobile Alliance (OMA) provisioning server that stores a tree structure of the device, wherein the tree structure is populated with one or more provisioning parameters and is written to the device.

8. The non-transitory media according to claim 7, wherein the tree structure is created by a manufacturer of the device.

9. The non-transitory media according to claim 7, wherein the one or more provisioning parameters inform the device how a network operator wants the device to behave.

10. The non-transitory media according to claim 7, wherein the network operator server is unaware of the device's capabilities.

11. The non-transitory media according to claim 7, wherein the one or more attributes originate from one or more device attribute providers.

12. The non-transitory media according to claim 11, wherein the one or more device attribute providers include at least one of a manufacturer, a retailer, and an end-user.

13. A system for writing provisioning parameters to a device, comprising:

a Global WiMAX Device Registry for associating a hardware identifier and one or more attributes for each of a plurality of devices;

an Open Mobile Alliance (OMA) provisioning server for associating the hardware identifier and a tree structure for each of the plurality of devices;

a provisioning system for retrieving a tree structure of the device from the Open Mobile Alliance (OMA) provisioning server and for populating at least one tree structure with one or more provisioning parameters; and a network operator server for communicating with the Global WiMax Device Registry to retrieve one or more device attributes of the requesting device and for writing the populated tree structure to the device requesting access to the network operator's communication network.

14. The system according to claim 13, wherein the network operator server communicates with the Global WiMAX Device Registry to retrieve one or more device attributes of the requesting device when the network operator has no knowledge of capabilities of the requesting device.

15. The system according to claim 13, wherein the Global WiMAX Device Registry communicates a hardware identifier of the requesting device to the an Open Mobile Alliance (OMA) provisioning server in order identify the at least one tree structure.

16. The system according to claim 13, wherein the one or more provisioning parameters are determined by the network operator.

17. The system according to claim 16, wherein the one or more provisioning parameters inform the requesting device how the network operator wants the requesting device to behave.

18. The system according to claim 13, wherein at least one tree structure of at least one device of the plurality of devices is created by a manufacturer of the at least one device.

* * * * *